(12) United States Patent
Hilding et al.

(10) Patent No.: US 11,325,136 B2
(45) Date of Patent: May 10, 2022

(54) SEAL ASSEMBLY FOR A CENTRIFUGAL SEPARATOR

(71) Applicant: ALFA LAVAL CORPORATE AB, Lund (SE)

(72) Inventors: Klas Hilding, Älta (SE); Jouko Pitkämäki, Eskilstuna (SE); Peter Thorwid, Sundbyberg (SE); Anders Ekström, Täby (SE)

(73) Assignee: ALFA LAVAL CORPORATE AB, Lund (SE)

( * ) Notice: Subject to any disclaimer, the term of this patent is extended or adjusted under 35 U.S.C. 154(b) by 255 days.

(21) Appl. No.: 16/481,349

(22) PCT Filed: Mar. 15, 2018

(86) PCT No.: PCT/EP2018/056574
§ 371 (c)(1),
(2) Date: Jul. 26, 2019

(87) PCT Pub. No.: WO2018/184813
PCT Pub. Date: Oct. 11, 2018

(65) Prior Publication Data
US 2020/0016610 A1    Jan. 16, 2020

(30) Foreign Application Priority Data
Apr. 7, 2017    (EP) ..................... 17165413

(51) Int. Cl.
*B04B 7/00*    (2006.01)
*B04B 1/08*    (2006.01)
(Continued)

(52) U.S. Cl.
CPC .................. *B04B 7/00* (2013.01); *B04B 1/08* (2013.01); *B04B 11/02* (2013.01); *F16J 15/342* (2013.01); *F16J 15/3452* (2013.01)

(58) Field of Classification Search
CPC .... B04B 7/00; B04B 1/08; B04B 11/02; F16J 15/342; F16J 15/3452
(Continued)

(56) References Cited

U.S. PATENT DOCUMENTS 3,126,338 A    3/1964  Steinacker
3,602,425 A    8/1971  Schmidt
(Continued)

FOREIGN PATENT DOCUMENTS

DE    1 910 576         9/1970
DE    1910576 A1 *      9/1970 ............ B04B 11/02
(Continued)

OTHER PUBLICATIONS

DE 1910576 Description Espacenet Machine Translation.*
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP (57) ABSTRACT

A seal assembly for providing a seal between a first zone and a second zone includes a rotatable sealing member including a first sealing ring, a stationary sealing member including a second sealing ring and a device for bringing the first and second sealing rings into engagement with each other. The first and second sealing rings are arranged so that a double contact seal having at least one chamber arranged at a radial plane is formed upon engagement between the first and second sealing rings. The seal assembly further includes at least one fluid connection to the chamber. A centrifugal separator includes such a seal assembly.

9 Claims, 4 Drawing Sheets

(51) Int. Cl.
    *B04B 11/02*     (2006.01)
    *F16J 15/34*     (2006.01)

(58) Field of Classification Search
    USPC .................................................. 494/38, 41
    See application file for complete search history.

(56) References Cited

U.S. PATENT DOCUMENTS

| | | | |
|---|---|---|---|
| 3,724,748 A | 4/1973 | Jacobson | |
| 3,759,591 A | 9/1973 | Wright et al. | |
| 4,196,911 A * | 4/1980 | Matsushita | F16J 15/342 |
| | | | 277/401 |
| 4,654,023 A | 3/1987 | Földhazy | |
| 4,759,744 A | 7/1988 | Krook | |
| 6,135,458 A | 10/2000 | Fuse | |
| 6,439,577 B2 | 8/2002 | Jorgensen et al. | |
| 2005/0248093 A1 * | 11/2005 | Keba | F16J 15/004 |
| | | | 277/358 |
| 2009/0236296 A1 | 9/2009 | Schmid | |
| 2009/0280974 A1 * | 11/2009 | Klintentedt | B04B 7/00 |
| | | | 494/41 |

FOREIGN PATENT DOCUMENTS

| | | | |
|---|---|---|---|
| EP | 0241128 A1 | 10/1987 | |
| EP | 0 619 145 A2 | 10/1994 | |
| EP | 0 961 059 A1 | 12/1999 | |
| EP | 0961059 A1 * | 12/1999 | ............ F16J 15/342 |
| JP | 58-25170 Y2 | 5/1983 | |
| JP | 62-254855 A | 11/1987 | |
| JP | 2-112343 U | 9/1990 | |
| JP | 7-208612 A | 8/1996 | |
| JP | 3192152 B2 | 7/2001 | |
| JP | 2009-262104 A | 11/2009 | |
| JP | 2009-541030 A | 11/2009 | |
| WO | WO 2008/013495 A1 | 1/2008 | |
| WO | WO 2013/034495 A2 | 3/2013 | |

OTHER PUBLICATIONS

International Search Report, issued in PCT/EP2018/056574, dated May 22, 2018.
Written Opinion of the International Searching Authority, issued in PCT/EP2018/056574, dated May 22, 2018.
English translation of the Japanese Office Action, dated Aug. 24, 2020, for Japanese Application No. 2019-550183.

* cited by examiner

SEAL ASSEMBLY FOR A CENTRIFUGAL SEPARATOR

FIELD OF THE INVENTION

The present invention relates to the field of centrifugal separation, and more specifically to hermetic seals for centrifugal separators.

BACKGROUND OF THE INVENTION

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

High-speed centrifugal separators usually have stationary inlet and outlet pipes sealed in respect to the rotatable part of the separator. The seal may be a hermetic seal, such as a mechanically hermetic seal, used when the material to be separated in the centrifugal separator must not be exposed to or come in contact with the atmosphere. Thus, a hermetic seal reduces the risk of any substance, such as oxygen, or particle in the atmosphere from contaminating the liquid fed or a separated phase.

An example is shown in U.S. Pat. No. 4,759,744, which shows a centrifugal separator having mechanical seals both at the inlets and the outlets However, two-phase hermetic outlet seals, i.e. seals which are to be used at the outlet in a separator discharging two separated liquid phases, are normally complicated constructions with a lot of parts to be assembled. This makes it difficult both to assembly the separator, but also to serve and take apart. Such hermetic outlets are often designed with focus on the dominating liquid phase that is separated. Thus, in a centrifugal separator of so called purifier-type, in which two liquid phases (and possibly a solid phase) are separated and the dominating phase is the separated liquid phase of low density, the outlet is normally designed to focus on handling the liquid light-phase. In contrast, in a centrifugal separator of so called concentrator-type, in which two liquid phases (and possibly a solid phase) are separated and the dominating phase is the separated liquid phase of high density, the outlet is normally designed to focus on handling the liquid heavy-phase. Consequently, this makes the outlets look different and at least two different variants may be needed, which is a drawback if the centrifugal separator is to be used in both purifier and concentrator applications.

Thus, there is a need in the art for a hermetic seal for centrifugal separators that can handle both a large amount of light-phase liquid and a large amount of heavy-phase liquid.

SUMMARY OF THE INVENTION

A main object of the present invention is to provide an improved seal assembly.

A further object is to provide a seal assembly that facilitates a hermetic outlet or inlet seal for a centrifugal separator As a first aspect of the invention there is provided a seal assembly for providing a seal between a first zone and a second zone, comprising a rotatable sealing member comprising a first sealing ring and arranged to be fitted on to a rotating member that rotates around an axis of rotation (X), a stationary sealing member comprising a second sealing ring; wherein the second sealing ring is axially aligned with the first sealing ring around the axis of rotation (X);

means for bringing the first and second sealing rings into engagement with each other, thereby forming at least one sealing interface between the first and second sealing rings; wherein the at least one formed sealing interface extends substantially in parallel with a radial plane (p) with respect to the axis of rotation (X); and further wherein the first zone is located radially inside and extends axially through the sealing rings and the second zone is arranged radially outside the sealing rings;

wherein the first and second sealing rings are arranged so that a double contact seal having at least one chamber arranged at the radial plane is formed upon engagement between the first and second sealing rings, and wherein the seal assembly further comprises at least one fluid connection to the chamber.

The seal assembly is thus a mechanical seal that may form a hermetic seal. The seal assembly is for forming a seal between a stationary part and a rotatable part.

The rotatable sealing member may be arranged to be fitted onto other rotatable parts, such as shafts or the like, i.e. onto a rotating member. The first sealing ring of the rotatable part is arranged in a plane perpendicular to the rotational axis.

The stationary sealing member is axially aligned with the rotatable sealing member so that the first and second sealing rings are axially aligned. Thus, the second sealing ring may be arranged in the same plane as the first sealing ring and the stationary sealing member may be arranged to be fitted or attached to a further stationary part.

The first sealing ring may be a wear ring and the second sealing ring may be a seal ring. Thus, the first sealing ring, arranged to be rotated, may be of a material that is harder than the second sealing ring.

Further, there are means for bringing the first and second seal rings into engagement with each other. However, this still means that a liquid seal film may be formed at the sealing interface during rotation of the rotatable sealing member. The means for bringing the sealing rings into engagement with each other may be for bringing the sealing rings into engagement with each other when the rotatable sealing member is at rest. Thus, at the interface between the stationary part and the rotating part a liquid seal film may be formed, e.g. between the wear ring and the seal ring. Such a micro-thin film may be formed by a fluid in the first or second zone.

The means for bringing the first and second seal ring into engagement may comprise resilient means, such as at least one spring, that axially brings the first and/or second seal ring into engagement with each other. The resilient means may thus be arranged axially above the first or second seal rings. As an example, the resilient means may be a part of the stationary sealing member that pushes the second sealing ring in the axial direction. Thus, the resilient means may be for bringing and/or biasing the second sealing ring into engagement with the first sealing ring when the rotatable sealing member is at rest.

The at least one fluid connection may be arranged so that is also passes the resilient means, such as passing through the volume or volumes in which springs that bias the sealing rings against each other are located.

The at least one formed sealing interface extends substantially in a radial plane (p) with respect to the axis of rotation. A radial plane (p) is thus perpendicular to the axis (x) of rotation. However, the sealing interfaces may be slanting a few degrees with respect to a radial plane, i.e. the sealing interface does not have to be exactly parallel to the radial plane.

Further, due to the formed sealing interface, a seal is formed between a first zone defined as extending axially through the sealing rings, and a second zone. The first zone may thus extend through the middle of the rings, thus extend concentrically with the sealing rings around rotational axis (x). The first zone may thus also extend through the rotatable and the stationary sealing members.

The second zone is defined as being radially outside of the first and second sealing rings. The formed sealing interface thus seals the zone within the rings from the zone radially outside of the rings.

The sealing rings are further designed so that a chamber is formed within the first and/or second sealing rings, so that a double-contact seal is formed. The double-contact seal is thus a seal formed by two separated sealing interfaces between the first and second sealing rings with the chamber located radially between the two separated sealing interfaces The double-contact seal between the first and second sealing rings may thus be as seen in at least one axial plane. There are also fluid connections to the chamber, meaning that a fluid may be supplied to the chamber or withdrawn to the chamber.

The first aspect of the invention is based on the insight that the seal assembly is easy to assemble, e.g. due to the sealing interface formed in a plane perpendicular to the rotational axis which makes the seal easy to assemble and disassemble axially.

Further, due to the formed chamber, a double-contact seal is formed having only two sealing rings.

This means that the seal assembly also is compact and has a few parts. Thus, the seal assembly may be easy to mount or disassemble if fitted e.g. onto a centrifugal separator, which facilitates use during e.g. service of the centrifuge rotor of a centrifugal separator.

The fluid connections to the chamber is advantageous in that a fluid may be supplied to the chamber having a higher pressure than e.g. a fluid in the first zone or second zone during use of the seal. This thus further prevents leakage of fluid from the first zone to the second zone, or vice versa.

The fluid connections also facilitate detection of leakage in the double contact seal. The chamber may thus function as a leakage chamber, and any fluid that has leaked through one part of the double-contact seal into the chamber may via the fluid connections be detected from the outside of the seal assembly. Thus, leakage from the first or second zone through the sealing interface reaches the chamber before reaching the other zone. Thus, the chamber may prevent leakage directly from the first to the second zone, or vice versa.

The fluid connections may also be used for supplying cooling fluid to the chamber. The cooling fluid may be a liquid, such as water, or a gas.

In embodiments of the first aspect of the invention, at least one fluid connection is formed within the second sealing ring.

Thus, the at least one fluid connection may be formed within the stationary sealing ring. The fluid connections may comprise at least two connections to the chamber, one for supplying fluid and one for withdrawing fluid. The fluid connections may be channels formed in the second sealing ring so that the chamber may be accessed from outside of the sealing ring. Thus, both in and out connections to the chamber may be formed in the second sealing ring to the outside of the sealing ring. The fluid connections may also extend further, i.e. to the outside of the stationary sealing member, and also e.g. so that the fluid supplied and/or withdrawn from the chamber passes the means for bringing the first and second sealing rings into engagement with each other when the rotatable sealing member is at rest, such as passing through the volume in which a resilient means is arranged.

In embodiments of the first aspect of the invention, at least one of the first and second sealing rings has at least one recess so that the double contact seal having at least one chamber arranged at the radial plane is formed upon engagement between the first and second sealing rings.

The at least one recess, or indentation, may thus be arranged in one or both of the sealing rings at a surface that is brought into engagement with the other sealing ring.

This means that the recess is arranged at the sealing interface to form a double-contact seal with the chamber being located within the first and/or second sealing rings. Thus, the walls defining the chamber may all be part of the first and/or second sealing rings.

As an example, the at least one recess may be arranged in the first sealing ring, such as solely in the first sealing ring, so that the chamber is formed within the first sealing ring.

As a further example, the at least one recess may be arranged in the second sealing ring, such as solely in the second sealing ring, so that the chamber is formed within the second sealing ring.

Further, the at least one recess may be arranged in both the first and second sealing rings so that the chamber is formed within both sealing rings.

The recess may have an axial height that about half the axial height of a sealing ring, or less than half the axial height of a sealing ring.

As an example, the at least one recess is concentric with the sealing rings. Thus, the recess may be evenly distributed around the axis of rotation.

At least one recess may be arranged so that an annular chamber is formed. Thus, the recess may be annularly arranged as an annular groove in the surface of the first and/or second sealing rings in the surface of a sealing ring.

However, the at least one recess do not have to be completely annular. Instead several recesses distributed at a radial distance may form more than one chamber at the sealing interface.

In embodiments of the first aspect of the invention, the rotatable sealing member comprises vanes arranged in the second zone for causing acceleration a fluid present in the second zone upon rotation of the rotatable sealing member.

The rotatable sealing member may comprise at least 4 vanes, such as at least 8 vanes. Thus, upon rotation of the rotatable sealing member, the vanes may aid in transporting the fluid in the second zone. This may be useful if the sealing arrangement is arranged at an inlet or outlet of a centrifugal separator. The vanes may for example be arranged axially below the sealing interface.

As a second aspect of the invention, there is provided a centrifugal separator for separation of at least two components of a fluid mixture which are of different densities, which centrifugal separator comprises a stationary frame, a rotatable part comprising a spindle and a centrifuge rotor, the rotatable part being supported by the frame to rotate around an axis (X) of rotation, wherein the centrifuge rotor is mounted to a first end of the spindle to rotate together with the spindle and comprises a rotor casing enclosing a separation space, fluid connections for supplying or discharging process fluid or service fluid to the separator, the fluid connections comprising an inlet for supplying the fluid mixture to be separated to the separation space and at least one liquid outlet for discharging a separated liquid phase from the separation space;

wherein the centrifugal separator comprises a seal assembly according to the first aspect arranged concentrically with the rotational axis (x) at the inlet and/or at the at least one liquid outlet, wherein the rotatable sealing member of the seal assembly is attached to the rotatable part of the centrifugal separator and the stationary sealing member is attached to the stationary frame, thereby forming a connection between the rotatable part and the stationary frame, and wherein the first zone of the seal assembly is in fluid communication with a fluid connection of the separator and the second zone is in fluid communication with either a different fluid connection of the separator or a volume that is not in fluid communication with any process or service fluid of the separator, thereby forming a seal between the first and second zone.

The centrifugal separator is for separation of a fluid mixture, such as a gas mixture or a liquid mixture. The stationary frame of the centrifugal separator is a non-rotating part, and the rotatable part may be supported by the frame by at least one bearing device, such as by at least one ball-bearing supporting the spindle.

The centrifuge rotor is adjoined to a first end of the spindle and is thus mounted to rotate with the spindle. During operation, the spindle thus forms a rotating shaft. The first end of the spindle may be an upper end of the spindle. The spindle is thus rotatable around the axis of rotation (X). The spindle may be arranged to rotate at a speed of above 3000 rpm, such as above 3600 rpm. The spindle may be a hollow spindle so that the inlet and/or at least one outlet may extend through the spindle.

The spindle may further have a diameter of at least 5 mm, such as at least 10 mm. For example, the outer diameter of the spindle may be between 5-300 mm, such as between 10-200 mm.

The centrifugal separator may of course also comprise a drive member for rotating the rotatable part, and thereby the hollow spindle and the centrifuge rotor mounted on the spindle. Such a drive member for rotating the hollow spindle may comprise an electrical motor having a rotor and a stator. The rotor may be provided on or fixed to the spindle. Alternatively, the drive member may be provided beside the spindle and rotate the rotatable part by a suitable transmission, such as a belt or a gear transmission.

The rotor casing of the centrifuge rotor encloses, or forms within itself, a separation space in which the separation of the fluid mixture takes place. The separation space may comprise a stack of separation discs arranged centrally around the axis of rotation. Such separation discs form surface enlarging inserts in the separation space. The separation discs may have the form of a truncated cone, i.e. the stack may a stack of frustoconical separation discs. The discs may also be axial discs arranged around the axis of rotation.

The fluid connections of the separator may thus comprise process fluid connections that form inlets and outlets to the separation space. The process fluid is thus the fluid mixture to be separated or a separated phase, i.e. a fluid that comes in contact with the separation space of the separator. The inlet may extend through the hollow spindle along the axis of rotation. The at least one liquid outlet for fluid that has been separated may comprise a first outlet and a second outlet arranged at a larger radius from the rotational axis as compared to the first liquid outlet. Thus, liquids of different densities may be separated and be discharged via the first and second liquid outlets, respectively. The process fluid connections may further comprise sludge outlets for discharging a phase at the periphery of the separation space, i.e. for discharging mixed solid and liquid particles forming a heavy phase. Thus, the centrifuge rotor may comprise peripheral ports for discharging a sludge phase. During operation, sludge is collected in an outer peripheral part of the separation space inside or immediately inside such peripheral ports. These may be arranged to be opened intermittently, during a short period of time in the order of milliseconds, to enable discharge of a sludge phase from the separation space to the surrounding space. This is achieved by axially moving a hydraulically operable sliding bowl bottom from a position in which it covers the peripheral ports to a position in which it does not cover the peripheral ports, and back again, as known in the art.

The fluid connections may also comprise service fluid connections. Service fluid is a fluid used during operation of the separator but that does not come into contact with the separation space. The service fluid may comprise opening and/or closing fluid for an intermittent discharge system comprising a hydraulically operable sliding bowl bottom as described above. The service fluid may also comprise cooling fluid for e.g. any bearings of the separator.

Furthermore, the centrifugal separator comprises at least one a seal assembly according to the first aspect of the invention discussed above. The seal assembly may thus form a hermetic seal, i.e. a seal that is supposed to give rise to an air tight seal between a non-rotating member and the rotatable part.

The seal assembly is arranged at the inlet, at a liquid outlet or both. The seal assembly may thus be arranged axially above the centrifuge rotor, axially below the centrifuge rotor, or both. The rotatable sealing member is thus attached to the rotatable part whereas the stationary part may be attached to a stationary part, such as the frame. "Attached to the frame" may comprise connected to the frame, i.e. the stationary part may be attached to other stationary parts that in turn are attached to the frame.

The centrifugal separator may be a fully hermetic separator. As an example, the inlet channel in the spindle and the separation space of the centrifuge rotor may be connected in a pressure communicating manner. Further, the liquid outlets and the separation space of the centrifuge rotor may be connected in a pressure communicating manner.

The seal assembly is further arranged so that the first zone is in fluid communication with a first fluid connection, such as a first liquid outlet or the inlet. The second zone is in fluid communication with a different fluid connection, such as a second liquid outlet, or as an alternative, the second zone is not in fluid communication with any fluid connection.

In embodiments of the second aspect of the invention, the first and second zones of the seal assembly are each in fluid communication with different connections for supplying or discharging process fluid, thereby forming a seal between the connections.

As an example, the seal assembly may be connected to the liquid outlets so that the first zone is in fluid communication with a first liquid outlet and the second zone is connected to a second liquid outlet.

This is advantageous since it allows the centrifugal separator to operate in both purifier-mode, in which two liquid phases (and possibly a solid phase) are separated and the dominating phase is the separated liquid phase of low density, and in concentrator-mode, in which two liquid phases (and possibly a solid phase) are separated and the dominating phase is the separated liquid phase of high density. Thus, the seal assembly makes the separator more flexible in that the outlet seal does not have to be changed depending on the application. Thus, both "zones" of the seal assembly are capable to handle a large portion of the separated liquid phase.

Thus, the first zone may be in fluid communication with a first liquid outlet for discharging a liquid light phase, whereas the second zone may be in fluid communication with a second liquid outlet for discharging a liquid heavy phase, i.e. a phase having higher density than the liquid light phase. In other words, the seal assembly may be arranged to form a hermetic outlet, such as an outlet arranged axially above the centrifuge rotor.

As a further example, the seal assembly may be connected to the liquid inlet so that the first zone is in fluid communication with the liquid inlet and the second zone is connected to a liquid outlet.

Thus, the seal assembly may be arranged so that the first zone is in fluid communication with the inlet arranged within the hollow spindle, and the separator may be arranged to discharge a liquid phase via a further channel within the spindle that is in fluid communication with the second zone of the seal assembly. The further channel may thus be an annular channel arrange at a further radial distance compared to the inlet channel within the spindle.

In embodiments of the second aspect of the invention, the centrifugal separator is further comprising a second hermetic seal that seals the second zone from the outside of the rotatable part.

The second hermetic seal may also be a mechanical seal, i.e. may seal the second zone from the surroundings by means of mechanical parts, and not using e.g. liquid seals such as a hydro hermetic seal. A mechanical seal usually prevents oxygen transport to a higher degree as compared to a hydro hermetic seal.

The second hermetic seal may comprise a stationary part arranged to be fitted onto a non-rotating member, such as the frame, and a rotatable part arranged on the rotatable part of the centrifuge.

The centrifugal separator may comprise a seal assembly according to the first aspect at the outlet and also the second hermetic seal may be arranged at the outlet. The second hermetic seal may be arranged radially outside the seal assembly of the first aspect and e.g. axially below the seal assembly of the first aspect of the invention.

In embodiments of the second aspect of the invention, the second zone is in fluid communication with the outside of the separator, thereby forming a seal between the first zone and the outside of the separator.

Thus, the first zone may be connected to a liquid outlet, and the second zone may be connected to the outside of the separator. This may be advantageous if only a single liquid phase is to be discharged from the separator. The outside may thus be outside of the rotor. The outside of the rotor may thus be radially outside the second zone, which is radially outside the first zone. However, the first zone may as an alternative be connected to the inlet when the second zone is connected to the outside of the separator.

In embodiments of the second aspect of the invention, the separation space comprises a stack of separation discs arranged under a top disc and the rotatable sealing member of the seal assembly is attached to the uppermost portion of the top disc.

The separation disc may be arranged between a lower distributor and the top disc. The top disc may have a larger radius and/or a larger thickness than the separation discs. The top disc may have a radially inner portion that extend axially upwards, and a conical portion extending in substantially the same angle as the separation discs. Thus, the rotatable sealing member of the seal assembly may be attached to this axially extending inner portion. The rotatable sealing member may thus be connected to the outlet feed tube of the centrifugal separator.

The rotatable sealing member of the seal assembly may be attached to the uppermost portion of the top disc by means of threads. This makes it easy to assemble and disassemble the seal e.g. when access to the separation space is required, such as during service.

The rotatable sealing member of the seal assembly may be a single unit. Thus, the rotatable sealing member of the seal assembly may be attached to the uppermost portion of the top disc as single unit.

In embodiments of the second aspect of the invention, the fluid connections of the seal assembly are connected to a vessel or volume outside the sealing rings so that any fluid leaking into the chamber may be detected in the vessel.

This is thus advantageous in that leakage in the seal is easily detected. The vessel or volume may be a volume e.g. within a tube or a closed connection vessel outside the separator.

In embodiments of the second aspect of the invention the first and second zones are free of paring discs.

A paring disc refers to a stationary impeller mounted in at the outlet in order to aid in discharging a separated liquid phase. It may convert the rotating energy of the liquid into pressure.

The inventors have found that the seal assembly allows for a low pressure-drop, meaning that paring discs may be unnecessary for discharging the separated liquid phases.

However, in embodiments a paring disc is arranged in the first or second zone.

DETAILED DESCRIPTION

The seal assembly and centrifugal separator according to the present disclosure will be further illustrated by the following description of embodiments with reference to the accompanying drawings.

Figure 1A:
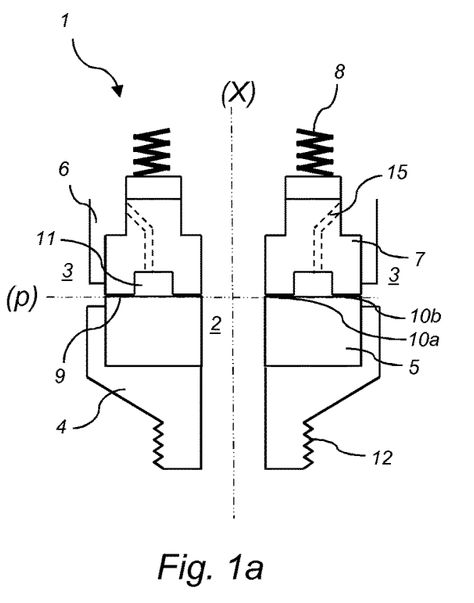
FIGS. 1*a-d* show schematic drawings of embodiments of a seal assembly.

FIG. 1*a* shows a schematic section drawing of an embodiment of a seal assembly 1. The seal assembly 1 comprises a rotatable sealing member 4 and a stationary sealing member 6 that forms a seal between a first zone 2 and a second zone 3. The rotatable sealing member comprises a first sealing ring, a wear ring, 5, that forms a sealing interface 9 against a second sealing ring, a seal ring, 7. The second seal ring 7 is brought into engagement with the first seal ring 5 due to the action of the biased spring 8, that thus press the second sealing ring 7 axially against the first seal ring 5.

The rotatable sealing member 4 is arranged to be fitted onto a rotating member of e.g. a centrifugal separator. This may be achieved by threads 12 arranged at an axially lower part of the rotatable sealing member 4. The stationary sealing member 6 may thus instead be arranged to be attached to a stationary member of e.g. a centrifugal separator, so that the seal assembly 1 forms a seal between the rotating member and the stationary member of a centrifugal separator. The rotatable sealing member 4 is thus arranged to rotate during operation, whereas the stationary sealing member 6 is arranged to stand still during operation The rotatable sealing member 4, and the first sealing ring 5, is arranged around an axis of rotation (X), meaning that the rotatable sealing member is arranged to rotate around (X). Also the stationary sealing member 6, as well as the second sealing ring 7, is arranged around the axis of rotation (X). The sealing interface 9 between the sealing rings is thereby formed in a radial plane (p) that extends substantially perpendicular to the axis of rotation (X). The seal assembly 1 further forms a seal between a first zone 2 and a second zone 3. The first zone is arranged so that it extends axially through the sealing rings 5 and 7, i.e. at a radially inner position, whereas the second zone 3 is arranged radially outside the sealing rings 5 and 7. However, the second zone 3 does not have to extend circumferentially around the whole periphery of the sealing rings 5 and 7, but may extend around a portion of the circumference of the sealing rings 5 and 7.

Furthermore, the sealing rings 5 and 7 are arranged so that a double contact seal is formed upon engagement between the sealing rings. The double contact seal is formed by a radially inner portion 10*a* of the sealing interface 9 and a radially outer portion 10*b* of the sealing interface 9. Between the radially inner and outer portions 10*a* and 10*b* a chamber 11 is arranged. In the embodiment of FIG. 1*a*, the chamber 11 is formed by an annular recess in the second sealing ring 7. However, the recess does not have to extend around the whole circumference of a sealing ring, but may also extend around a portion of the circumference of the sealing ring. Moreover, there is a fluid connection 15 to the formed chamber 11 that extends through the second sealing ring 7. The fluid connection 15 may thus comprise at least one channel within the sealing ring to the chamber. The fluid connection may have a single channel or more than one channel to the chamber 11. During operation, the fluid connection may be used for supplying a fluid at a pressure that is higher than the pressure of the fluid within e.g. the first zone 2, thereby decreasing the risk of fluid in the first zone 2 leaking radially outwards to the second zone 3. Thus, the fluid connection 15 may then comprise a channel for supplying fluid to the chamber 11 and a further channel for withdrawing fluid from the chamber 11.

The chamber 11 may also act as leakage chamber, meaning that if a fluid in e.g. the first zone 2 leaks through the seal radially outwards, this leakage may be collected within the chamber 11 and be detected using the fluid connection 15. The fluid connection 15 may then comprise a single channel so that any leakage within the chamber 11 may be withdrawn from the chamber 11 and be detected.

Figure 1B:
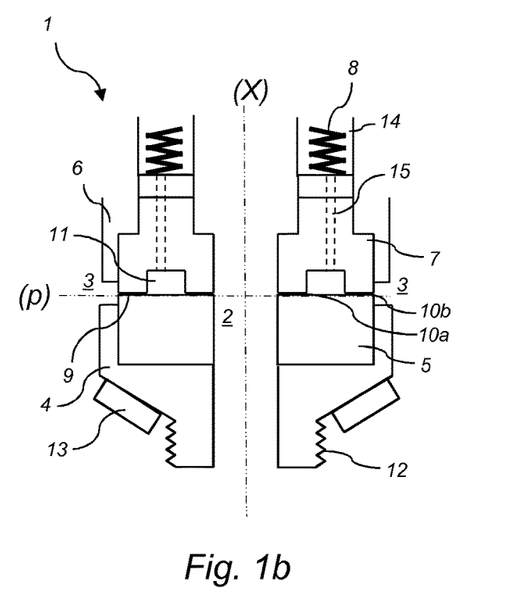

The seal assembly 1 of FIG. 1*b* is similar to the seal assembly of the embodiment in FIG. 1*a*, but the fluid connection 15 extends in a chamber 14 that surrounds the springs 8. Thus, any fluid supplied or withdrawn from chamber 11 is supplied or withdrawn so that it contacts springs 8. Furthermore, the seal assembly in the embodiment of FIG. 1*b* comprises wings 13 on the rotatable sealing member 4. These wings 13 thus rotate during rotation of the rotatable sealing member 4, and may aid in accelerating a fluid that is present in the second zone 3.

Figure 1C:
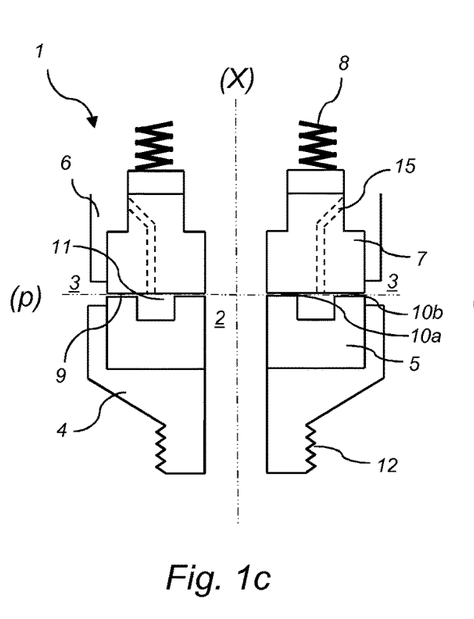

The seal assembly 1 shown in FIG. 1*c* is also similar to the seal assembly described in relation to the embodiment of FIG. 1*a*, but with the difference that the chamber 11 is formed by a recess only in the first sealing ring 5 of the rotatable sealing member 4.

Figure 1D:
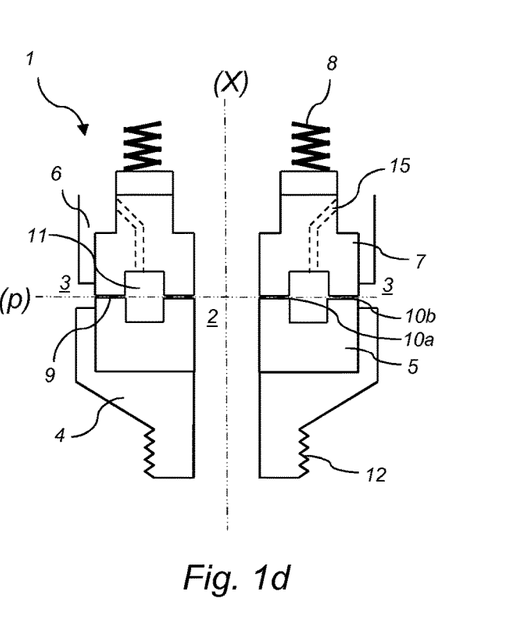

The seal assembly 1 shown in FIG. 1*d* is also similar to the seal assembly described in relation to the embodiment of FIG. 1*a*, but in this embodiment, the chamber 11 is formed by recesses in both the first sealing ring 5 and the second sealing ring 7. The recesses may thus be axially and radially aligned upon engagement between the sealing rings.

Figure 2:
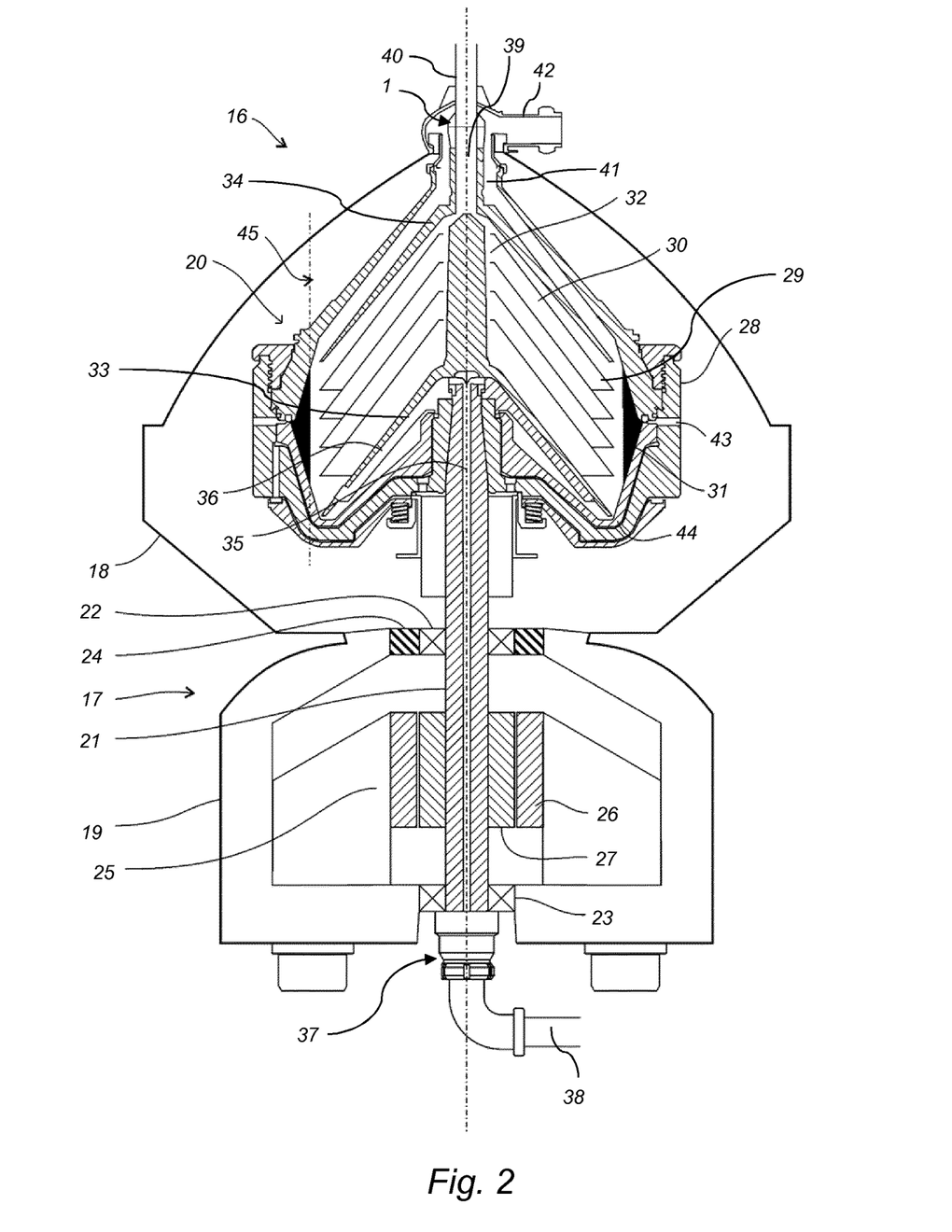
FIG. 2 shows a schematic drawing of an embodiment of a centrifugal separator.

FIG. 2 shows a centrifugal separator 16, having a frame 17 with an upper frame part 18 and a lower frame part 18. A rotatable part comprising centrifuge rotor 20 and hollow spindle 21 is arranged for rotation in the frame around a rotational axis (x). Spindle 21 is supported in the lower frame part by means of an upper 22 and a lower 23 bearing. The upper bearing is elastically connected to the frame by means of a spring device 24. An electric motor 25 comprising a motor stator 26 connected to the lower frame part and a motor rotor 27 connected to the spindle is configured to drive the spindle and thus the separator rotor. The centrifuge rotor 20 comprises a rotor casing 28 forming within itself a separation space 29. In the separation space a set of frusto-conical separation discs 30 is arranged centrally and coaxially along the rotational axis. The separation discs extend from a radially outer portion of the separation space, the sludge space 31, to a radially inner portion 32 of the separation space.

The separation discs 30 are arranged between a distributor 33 and an upper top disc 34. The top disc 34 aids in guiding separated liquid out of the separator and may have a larger radius and thickness compared to the separation discs 30. For clarity reason, only a few separation discs 30 are shown in FIG. 2. It is thus to be understood that the stack may comprise more than 50 separation discs, such as more than 100 separation discs, such as more than 150 separation discs.

The separation discs may comprise through holes which form channels (not shown) for axial flow of liquid when the separation discs are fitted in the centrifugal separator.

The separator 16 is further provided with a hermetic inlet comprising an inlet channel 35 formed as a central duct in the hollow spindle 21. The spindle thus takes the form of a hollow, tubular member.

The inlet further comprises channels 36 formed in the rotor and extending from the inlet channel to the separation space. The inlet is hermetically sealed from the surroundings of the separator by means of a seal 37 in the interface between the rotating part of the inlet channel and a stationary part 38 in the form of a stationary pipe. Introducing the liquid material from the bottom provides a gentle acceleration of the liquid material that is to be processed in the separator.

At the top of the separator shown in FIG. 1, there is arranged a first liquid outlet 39 extending from and communicating with the radially inner portion 32 of the separation space and connecting it to a stationary outlet channel 40. Further, the separator has a second liquid outlet 41 communicating with the radially outer portion of the separation space and connecting it to a stationary outlet channel 42. Thus, first liquid outlet 39 is for discharging a liquid light phase whereas the second liquid outlet 41 is for discharging a liquid heavy phase, i.e. a phase having higher density than the liquid light phase.

Figure 3:
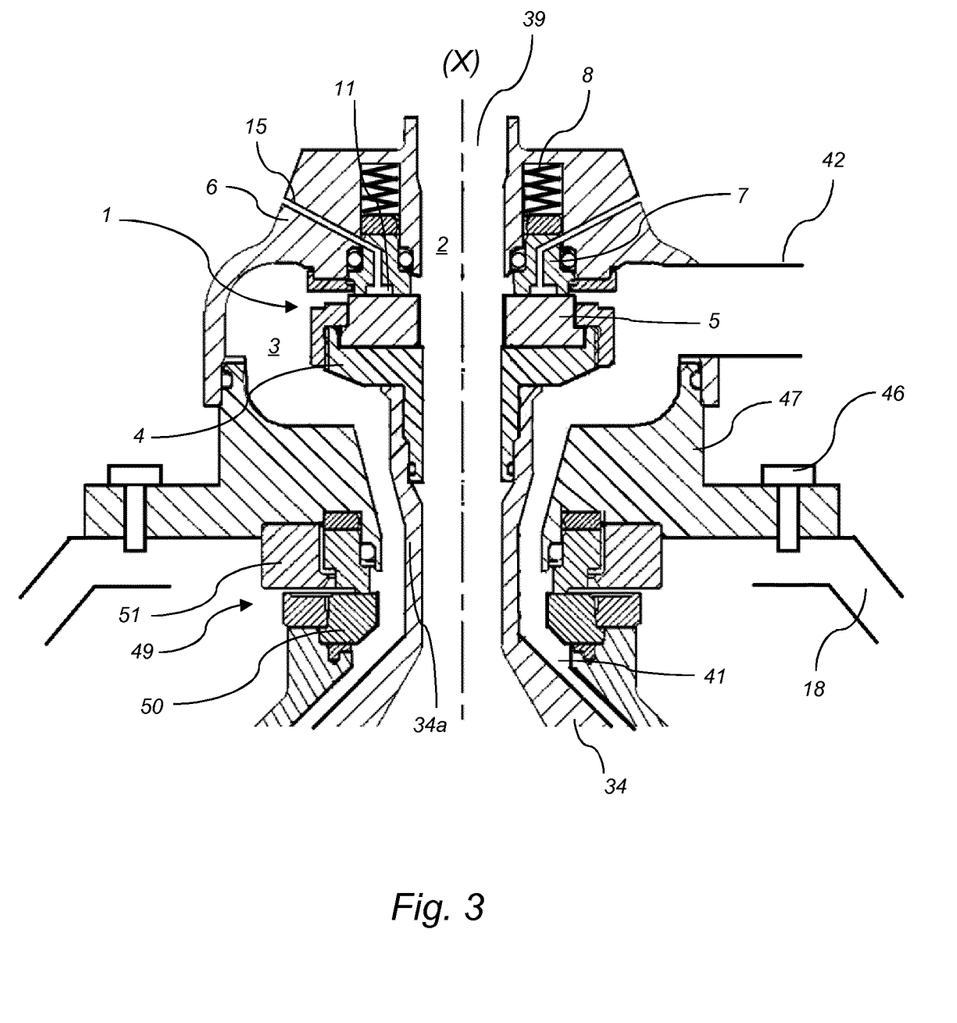
FIG. 3 shows a close-up view of the outlet of the centrifugal separator of FIG. 2.

The first and second liquid outlets are hermetically sealed using a seal assembly 1 according to the present invention, and further shown in detail in FIG. 3

The inlet channel and the two liquid outlets thus form process fluid connections to the separation space of the separator The rotor 20 is provided at its outer periphery with a set of sludge outlets 43 in the form of a plurality of ports extending from the sludge space 31 to a space outside the rotor. The opening of the sludge outlets is controlled by means of an operating slide 44 arranged to be axially displaceable in the rotor between a first position where the second outlet is closed and a second position where the second outlet is open. The displacement of the operating slide is performed by means of controlling the amount of operating water in chambers positioned below the operating slide, as known in the art.

During operation of the centrifugal separator 16 the motor 25 provides a driving momentum to the spindle 21 to bring the rotor 20 into rotation. A fluid product, being a liquid mixture of components, is supplied to the separator through stationary pipe 38 and inlet channel 35 through spindle 21 and further into the separation space 29 via channels 36.

In the hermetic type of inlet of the separator 16, the acceleration of the liquid mixture is initiated at a small radius and is gradually increased while the liquid enters the separation space 29 via channels 36. However, liquid may also be introduced when the rotor is already running at its operational speed. Liquid material may thus be continuously introduced into the rotor 20.

In the separation space 29 the fluid product is subjected to centrifugal forces, and a first liquid phase of the product having a lower density and a second liquid phase of the product having a higher density and a sludge phase, comprising dense solid particles, are separated from the fluid product. The separation is facilitated by the frustoconical separation discs 30 that thus function as area-enlarging inserts. The first liquid phase of the product is transported radially inwards between the separation discs and towards the first liquid outlet 39 whereas the second phase is transported radially outwards and between the separation discs is forced or guided over the top disc 34 to the second liquid outlet 41. Any solids present in the fluid mixture that is separated are collected in the sludge space 16. While the separation process continues, the amount of sludge in the sludge space increases, whereby the interface 45 between the sludge accumulated in the sludge space and the fluid product in the separation space 29 is displaced radially inwards. To discharge this sludge phase, the sludge outlets 43 may be intermittently opened due to axial movement of the operating slide 44, as known in the art. However, the discharge of sludge may also take place continuously, in which case the sludge outlets 43 take the form of open nozzles and a certain flow of sludge and/or heavy phase is discharged continuously by means of centrifugal force.

In certain applications, the separator 1 only contains a single liquid outlet, such as only liquid outlet 39, and the sludge outlets 43, or only two liquid outlets 39 and 41 with no sludge outlet 43. This depends on the application, i.e. the liquid material that is to be processed.

In the embodiment of FIG. 2, the mixture to be separated is introduced via the inlet channel 35 of the spindle 21. However, the hollow spindle 21 may also be used for withdrawing e.g. the liquid light phase and/or the liquid heavy phase. In embodiments, the hollow spindle 6 comprises at least one additional duct. In this way, both the liquid mixture to be separated may be introduced into the rotor 20 via the inlet channel 35, and concurrently, the liquid light phase and/or the liquid heavy phase may be withdrawn through such an additional duct.

FIG. 3 shows a close-up view of the outlets at the uppermost part of the centrifugal separator 16 in FIG. 2 and how the seal assembly 1 is arranged at the outlets. As seen in FIG. 3, the rotatable sealing member 4 is attached to the axially uppermost portion 34*a* of the top disc 34, e.g. by means of threads 15 as seen in FIG. 1*a-d*. This makes the seal assembly easy to assemble and disassemble on the separator. The stationary sealing member 6 is attached via further stationary member 47 and screws 46 to the upper portion 18 of the frame. As discussed in relation to FIG. 1, the sealing ring 5 of the rotatable sealing member 4 and the sealing ring 7 of the stationary sealing member 6 form a sealing interface that is perpendicular to the axis of rotation (X), with the chamber 11 arranged at the interface and accessible via fluid connection 15. Further, the first zone 2 is thus in fluid communication with the first liquid outlet 39, meaning that separated liquid phase of lower density is discharged through the sealing rings. Further, the second zone 3 is in fluid communication with the second liquid outlet 41, meaning separated liquid phase of higher density is discharged radially outside the sealing rings and out via stationary pipe 42. The seal assembly 1 thus forms a seal between the separated liquid phases as well as a connection between the rotating rotor and stationary outlet pipes. O-rings 48, arranged around stationary sealing ring 7, further facilitate keeping the seal between the separated liquid phases. There is also a second hermetic seal 49 arranged at the second liquid outlet 41 for providing a seal between the second liquid outlet 41 and the outside of the rotor. This second hermetic seal 49 is arranged axially below the seal assembly 1 and comprises a rotatable sealing ring 50 that is connected to the rotor, and a stationary sealing ring 51 connected to the upper portion 18 of the frame.

As seen in FIG. 3, there are no paring discs for accelerating the discharged liquid phases in any of the outlets 39 or 40. The seal assembly thus provides for a low pressure drop so that such paring discs may be redundant. However, it is also to be understood that the centrifugal separator may comprise a paring disc for accelerating the flow of separated liquid is one or both outlet channels.

Figure 4:
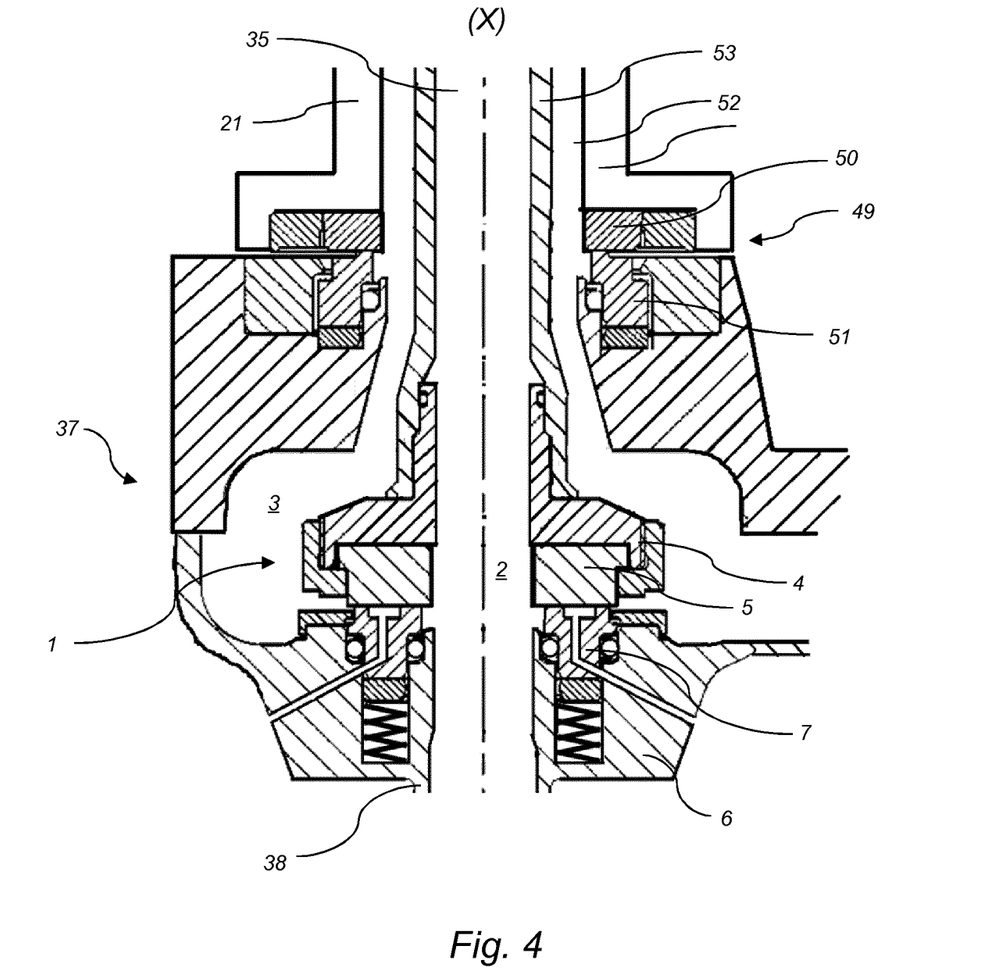
FIG. 4 shows a schematic drawing of an embodiment in which the seal assembly is arranged at the inlet of a centrifugal separator.

The seal assembly 1 may also be arranged at an inlet to a centrifugal separator. FIG. 4 shows an embodiment of a hermetic seal 37 arranged at the bottom of a centrifugal separator. The separator is almost identical to the separator discussed in relation to FIGS. 2 and 3, with the exception that a separated liquid phase is discharged at the same end as the liquid to be separated is supplied to the rotor, in this case at the bottom of the separator. FIG. 4 is thus a close-up view of the hermetic seal 37 arranged at the inlet and such an outlet. As seen in FIG. 4, the seal assembly 1 is arrange so that the rotatable sealing member 4 and rotatable sealing ring 5 is connected to the rotatable spindle, through which the inlet channel 35 extend. In this case, the inlet channel 35 forms a radially inner duct, and is surrounded by an annular outer duct 52 within the spindle 21, through which a separated liquid phase is discharged. The separated liquid phase discharged via duct 52 may be either the liquid light phase or the liquid heavy phase, as e.g. described in WO 2013/034495. The rotatable sealing member 4 is connected to the walls 53 within spindle 21, i.e. the walls between the inlet channel 35 and the annular outer duct 52, whereas the stationary sealing member 6, and thus the stationary sealing ring 7, is connected to the stationary inlet pipe 38 that supplies the fluid to be separated. Thus, the first zone 2 is in fluid communication with the inlet channel 35 and the second zone 3 is in fluid communication with the outlet channel 52. Other portions of the seal assembly 1 function as discussed in relation to the previous figures and embodiments. As seen in FIG. 4, there is also a second hermetic seal 49 that seals the outlet channel 52 towards the surroundings. This second hermetic seal 49 comprises a rotatable sealing ring 50 connected to the spindle 21 and a stationary sealing ring 51. However, as an alternative to the configuration of the inlet shown in FIG. 4, the annular outer channel 52 could be utilized as an inlet channel for supplying the fluid mixture to be separated whereas the radially inner duct 35 could be used as an outlet channel, also as discussed in WO 2013/034495.

The invention is not limited to the embodiments disclosed but may be varied and modified within the scope of the claims set out below. The invention is not limited to the orientation of the axis of rotation (X) disclosed in the figures. The term "centrifugal separator" also comprises centrifugal separators with a substantially horizontally oriented axis of rotation.

The invention claimed is:

1. A centrifugal separator for separation of at least two components of a fluid mixture having different densities, the centrifugal separator comprising:
   a stationary frame;
   a rotatable part comprising a spindle and a centrifuge rotor, the rotatable part being supported by the frame to rotate around an axis of rotation, wherein the centrifuge rotor is mounted to a first end of the spindle to rotate together with the spindle and comprises a rotor casing enclosing a separation space;
   an inlet for supplying the fluid mixture to be separated to said separation space and at least one liquid outlet for discharging a separated liquid phase from said separation space; and
   a seal assembly arranged concentrically with the rotational axis at the inlet and/or at the at least one liquid outlet, the seal assembly comprising:
   a rotatable sealing member comprising a first sealing ring, said rotatable sealing member being arranged to be fitted onto a rotating member that rotates around an axis of rotation;
   a stationary sealing member comprising a second sealing ring, wherein said second sealing ring is axially aligned with said first sealing ring around the axis of rotation; and
   at least one sealing interface between said first and second sealing rings,
   wherein said at least one sealing interface extends substantially in parallel with a radial plane with respect to the axis of rotation,
   wherein a first zone is located radially inside and extends axially through said sealing rings and a second zone is arranged radially outside said sealing rings,
   wherein said first and second sealing rings are arranged so that a double contact seal having at least one chamber arranged at said radial plane is formed between the first zone and the second zone upon engagement between the first and second sealing rings, wherein the rotatable sealing member of the seal assembly is attached to the rotatable part of the centrifugal separator and the stationary sealing member is attached to the stationary frame, thereby forming a connection between said rotatable part and said stationary frame,
   wherein the first zone of the seal assembly is in fluid communication with a first fluid connection of said separator and said second zone is in fluid communication with either a second fluid connection of said separator or a volume that is not in fluid communication with any process or service fluid of the separator, thereby forming a seal between said first and second zone, and
   wherein only the second sealing ring further comprises at least one fluid connection to said at least one chamber.

2. The centrifugal separator according to claim 1, wherein the first and second zones of the seal assembly are each in fluid communication with different connections for supplying or discharging process fluid, thereby forming a seal between said connections.

3. The centrifugal separator according to claim 2, wherein the seal assembly is connected to the at least one liquid outlet so that said first zone is in fluid communication with a first liquid outlet and said second zone is connected to a second liquid outlet.

4. The centrifugal separator according to claim 2, wherein the seal assembly is connected to the liquid inlet so that said first zone is in fluid communication with the liquid inlet and said second zone is connected to the at least one liquid outlet.

5. The centrifugal separator according to claim 2, further comprising a second hermetic seal that seals the second zone from the outside of the rotatable part.

6. The centrifugal separator according to claim 1, wherein the second zone is in fluid communication with the outside of the separator, thereby forming a seal between the first zone and the outside of the separator.

7. The centrifugal separator according to claim 1, wherein the separation space comprises a stack of separation discs arranged under a top disc and wherein the rotatable sealing member of the seal assembly is attached to the uppermost portion of the top disc.

8. The centrifugal separator according to claim 1, wherein the at least one liquid outlet is connected to a vessel or volume outside said sealing rings so that any fluid leaking into the chamber may be detected in said vessel.

9. The centrifugal separator according to claim 1, wherein said first and second zones are free of paring discs.

* * * * *